United States Patent
Marshall et al.

(10) Patent No.: US 6,897,971 B1
(45) Date of Patent: May 24, 2005

(54) FACSIMILE DISTRIBUTION MANAGER

(75) Inventors: Keith Alan Marshall, Berthoud, CO (US); Mark Andrew Stephens, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/328,622

(22) Filed: Jun. 9, 1999

(51) Int. Cl.[7] ............................. G06K 1/00; H04N 1/00; H04N 1/32
(52) U.S. Cl. ...................... 358/1.15; 358/407; 358/434; 358/442; 358/468; 358/400; 358/436
(58) Field of Search ................ 358/1.15, 407, 358/434, 442, 468, 400, 436

(56) References Cited

U.S. PATENT DOCUMENTS

| | | | |
|---|---|---|---|
| 5,007,054 A | * 4/1991 | Lee et al. | 714/748 |
| 5,461,488 A | 10/1995 | Witek | |
| 5,513,126 A | 4/1996 | Harkins et al. | |
| 5,675,507 A | * 10/1997 | Bobo, II | 709/206 |
| 5,694,458 A | 12/1997 | Okada et al. | |
| 5,790,790 A | 8/1998 | Smith et al. | |
| 5,838,461 A | 11/1998 | Hsieh | |
| 5,872,845 A | * 2/1999 | Feder | 358/442 |
| 5,892,591 A | * 4/1999 | Anglin et al. | 358/407 |
| 5,917,615 A | * 6/1999 | Reifman et al. | 358/468 |
| 5,974,449 A | * 10/1999 | Chang et al. | 709/206 |
| 6,477,243 B1 | * 11/2002 | Choksi et al. | 379/100.06 |
| 6,498,661 B1 | * 12/2002 | Brossman et al. | 358/3.14 |
| 2002/0131573 A1 | * 9/2002 | Berkley et al. | 379/201.01 |

* cited by examiner

Primary Examiner—Edward Coles
Assistant Examiner—Houshang Safaipour
(74) Attorney, Agent, or Firm—Gates & Cooper LLP

(57) ABSTRACT

A method, apparatus, article of manufacture, and a memory structure for electronically distributing facsimile messages directly to users according to recipient preferences. The method comprises the steps of receiving a message from a transmitting facsimile via a telephone network, automatically parsing the message to extract a recipient direct dial telephone number from the message, receiving a fax payload from the transmitting facsimile in a fax server, determining an e-mail address and at least one recipient fax preference from the direct dial telephone number, processing the fax payload in the fax server according to the recipient fax preference, and directing the processed fax message according to the recipient fax preference. In one embodiment of the present invention, method further comprises the steps of reading a grayscale transform from a memory accessible to the fax server, and applying the grayscale transform to the fax payload. This allows the facsimile to be presented to the user with improved grayscale rendering accuracy. In another embodiment of the present invention, recipient's direct dial telephone number is extracted using the direct inward dial facility of a facsimile card, thus providing a simple straightforward means for determining the identity of the intended recipient. In another embodiment of the present invention, the e-mail address of the intended recipient is obtained from an address lookup facility of a messaging and collaboration application. The apparatus comprises means for performing the foregoing steps, and the article of manufacture comprises a program storage device tangibly embodying instructions for performing these steps.

32 Claims, 6 Drawing Sheets

FACSIMILE DISTRIBUTION MANAGER

CROSS-REFERENCE TO RELATED APPLICATIONS

This application is related to the following co-pending and commonly assigned patent application, which application is hereby incorporated by reference herein:

Application Ser. No. 09/277,056, entitled "METHOD AND APPARATUS FOR RENDERING GRAYSCALES AT A FACSIMILE PRESENTATION DEVICE USING A CALIBRATED THRESHOLD MATRIX," filed on Mar. 26, 1999, by Craig D. Brossman, Arianne T. Hinds, Nenad Rijavec, Mikel J. Stanich, Mark A. Stephens, and Raymond G. Wardell, now U.S. Pat. No. 6,498,661, issued Dec. 24, 2002, and Application Ser. No. 09/282,024, entitled "METHOD AND APPARATUS FOR RENDERING GRAYSCALES AT A FACSIMILE PRESENTATION DEVICE USING A CALIBRATED TRANSFORM," filed on Mar. 26, 1999, by Craig D. Brossman, Arianne T. Hinds, Nenad Rijavec, Mikel J. Stanich, Mark A. Stephens and Raymond G. Wardell, now U.S. Pat. No. 6,538,773, issued Mar. 25.

BACKGROUND OF THE INVENTION

1. Field of the Invention

The present invention relates to the transmission and distribution of facsimile messages, and in particular to a method and system for electronically distributing facsimile messages directly to users according to recipient preferences.

2. Description of the Related Art

Facsimile (fax) machines have become a popular means for sending text and images to recipients at remote locations.

Fax machines are particularly useful for small scale point to point communications, such as might be expected from a household to a small business. However, there are many difficulties in using fax communications between persons in large businesses. First, to provide reasonable walk-up access, a large number of fax machines is often required, at substantial cost. Second, each fax machine typically requires a dedicated telephone line, the cost of which is typically greater than the fax machine itself. Third, since there are a large number of fax machines, each with a separate telephone number, facsimile messages are often misdirected to the incorrect fax machine. The result is that the security of the fax transmission may be compromised. Even if a relatively large number of fax machines are provided, to receive a fax, the user must walk over to the work space to receive a facsimile, and may not be informed that the received facsimile is available for viewing until long after the facsimile arrives.

Another problem occurs if the addressee of the facsimile message is out of the office where the receiving fax machine is located. In such circumstances, someone monitoring the facsimile machine must receive the fax message and re-transmit the message to the location of the intended recipient. Not only does this require human intervention in what should be an automatic process, it also reduces the quality of the received fax.

Another problem associated with fax machines are unsolicited "junk faxes" received from advertisers. These unwanted transmissions consume electricity, paper, and toner, and decrease the service life of the fax machine.

What is needed is a simple, secure method for distributing facsimile transmissions without the disadvantages described above. The present invention satisfies that need.

SUMMARY OF THE INVENTION

To address the requirements described above, the present invention discloses a method, apparatus, and article of manufacture, for managing the distribution of facsimile messages.

The method comprises the steps of receiving a message from a transmitting facsimile via a telephone network, automatically parsing the message to extract a recipient direct dial telephone number from the message, receiving a fax payload from the transmitting facsimile in a fax server, determining an e-mail address and at least one recipient fax preference from the direct dial telephone number, processing the fax payload in the fax server according to the recipient fax preference, and directing the processed fax message according to the recipient fax preference. In one embodiment of the present invention, method further comprises the steps of reading a grayscale transform from a memory accessible to the fax server, and applying the grayscale transform to the fax payload. This allows the facsimile to be presented to the user with improved grayscale rendering accuracy. In another embodiment of the present invention, recipient's direct dial telephone number is extracted using the direct inward dial facility of a facsimile card, thus providing a simple straightforward means for determining the identity of the intended recipient. In another embodiment of the present invention, the e-mail address of the intended recipient is obtained from an address lookup facility of a messaging and collaboration application. The apparatus comprises means for performing the foregoing steps, and the article of manufacture comprises a program storage device tangibly embodying instructions for performing these steps.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
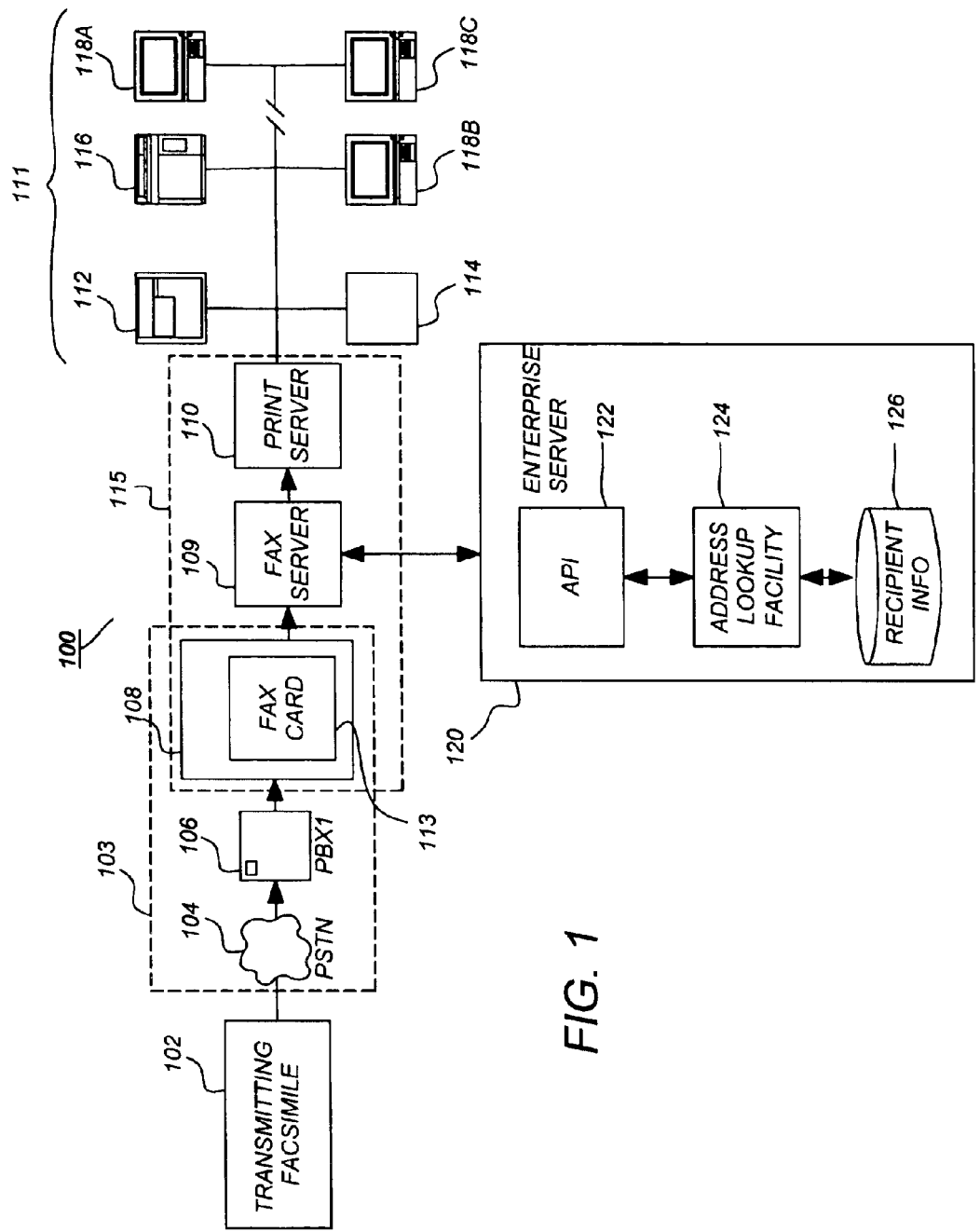
FIG. 1 is a block diagram showing one embodiment of the fax distribution system.

FIG. 1 is a block diagram showing one embodiment of the fax distribution system 100. The system comprises a fax server 110 communicatively coupled to an enterprise server 120. The enterprise server 102 implements a messaging and collaboration application such as LOTUS NOTES available from the LOTUS CORPORATION. The messaging and collaboration application includes an application program interface 122 giving access to an address lookup facility 124. The address lookup facility 124 has query-level access to a plurality of data records including fax recipient information 126.

The fax server 109 receives facsimile messages from a transmitting facsimile 102 via a communications network 103. In one embodiment, the communication network is a telephone network provided by the public switched telephone network (PSTN) 104 communicatively coupled to a private branch exchange (PBX). The PBX is an in-house telephone switching system that interconnects telephone extensions to each other and to the PSTN 104. It includes, for example, functions such as least cost routing for outside calls, call forwarding, accounting, teleconferencing. The PBX 106 is cooperatively coupled to a fax modem 108. The fax modem receives messages from the transmitting facsimile 102 via the PBX 106 in the form of multi-tones or pulses. These message tones include information comprising the telephone number to access the fax server 109 appended with a series tones describing the direct dial telephone number of the person to whom the facsimile message is addressed. The fax modem includes a fax card 113. The fax card 113 has a direct inward dial (DID) facility which automatically parses the telephone dial tones from the PBX 106 to separate the direct dial telephone number of the fax recipient from other information in the message. In one embodiment of the invention, the parsing process is implemented by identifying the first N tones as those providing access to the fax server 109, and the remaining tones as those which identify the direct dial telephone number of the fax recipient. This embodiment frees the fax server 109, or enterprise server 122 from the task of parsing the message tones, simplifying the design, and providing for enhanced fax server 109 and enterprise server 120 security. If desired, the fax card 113 can be implemented in the fax server 109, or in an integrated server 115 (such as the INFOPRINT manager server available from the IBM Corporation) combining the fax card 113, fax server 109, and the print server 110.

Typically, fax payload data comprising the image sent from the transmitting facsimile 102 to the recipient is in tagged image file format (TIFF). This information is stored in temporary storage in the fax server 109 until all of the fax payload data has been received.

After all of the fax payload has been received, it is processed according to the recipient fax preferences stored in the recipient information 126. The recipient fax preferences can include several parameters. For example, in one embodiment of the present invention, the fax payload is translated from TIFF to a portable document format (PDF) such as those formatted to be read by the ACROBAT product available from the ADOBE Corporation, before transmitting it to the recipient as an attachment to an e-mail message.

One of the recipient fax preferences includes an indication of the portable document format type and parameters (such as user preferences) describing the portable document format.

Another recipient fax preferences would include information sufficient to forward the fax payload to another number or e-mail address under certain circumstances. For example, if the recipient expected to be out of the office, the forwarding fax information can be used to forward the facsimile payload to a different facsimile number or to a different e-mail address.

Another recipient fax preference could include a provision for dealing with known junk facsimile sources. In this situation, when the user receives a junk fax, the user need only identify the fax as such. The source of the junk fax is then added to a list of junk fax purveyors. Further transmissions from the junk fax source are either blocked, rejected, or discarded or deleted after receipt, without further intervention by the user using this list. This is accomplished by examining an identification transmitted by the transmitting facsimile 102, and comparing that identification to a list of junk fax sources. In one embodiment, the telephone number of the source of the junk fax source is used for the transmitting facsimile 102 identification. This telephone number can also be used to transmit a message indicating that further transmissions to the recipient are not desired.

Another recipient preference relates to the reproduction of grayscales by the print server 110 and one of the facsimile presentation devices 111. The presentation devices 111 include for example, one or more computers 118A–118C (collectively referred to hereinafter as computers 118), a receiving facsimile 112, printing device 116, or other device 114 for rendering image information. After the fax server has processed the fax payload, additional processing can be performed in the print server 110 to assure that grayscales described in the fax payload are accurately reproduced in the presentation devices 111. This is accomplished by reading a grayscale transform from a memory and applying the grayscale transform to the fax payload. This can be accomplished using the methods and systems described in further detail in co-pending and commonly-assigned patent application Ser. No. 09/282,024, entitled "METHOD AND APPARATUS FOR RENDERING GRAYSCALES AT A FACSIMILE PRESENTATION DEVICE USING A CALIBRATED TRANSFORM," filed on Mar. 26, 1999, by Craig D. Brossman, Arianne T. Hinds, Nenad Rijavec, Mikel J. Stanich, Mark A. Stephens and Raymond G. Wardell, now U.S. Pat. No. 6,538,773, issued Mar. 25, 2003.

To provide additional security, increase speed, and to further reduce the possibility of receiving "junk faxes," the present invention also comprises a facility to identify when duplicative facsimile messages have been received at the fax server. In this embodiment, when the fax server 109 detects the reception of a facsimile message that is essentially identical to an earlier received fax payload (especially when transmitted from the same source), reception of the facsimile is terminated or flagged for deletion. In such cases, the earlier transmitted fax payload can be forwarded to the intended recipient, or to an administrator for human intervention and further action.

Another recipient preference is whether a confirming message should be sent to the transmitting facsimile. Suppose for example, that the facsimile message was received by the fax server 109, but was not delivered to the recipient (for example, because the direct dial number was incorrectly entered or because the recipient blocked the delivery of faxes), in this case, a confirming message is generated and sent to the transmitting facsimile 102. This confirming message can indicate, for example, the time and date that the facsimile message was actually delivered to the recipient's e-mail account, the day and time the e-mail was opened, or both. Further, in accordance with the recipient preferences (which can be set globally for all recipients in the facility), the confirming message can also comprise a portion of the fax payload (as received and processed according to the fax preferences) and other information. This indicates not only that the facsimile payload was received, but also the extent to which the text and images (including grayscales, if applicable) were adequately reproduced. In one embodiment, the confirming message is transmitted via an ordinary facsimile transmission. Alternatively, the confirming message may be sent by an e-mail to an account corresponding to the owner/user of the transmitting facsimile 102. The pairing between the e-mail address of the owner/user of the transmitting facsimile 102 can be obtained using a messaging and collaboration application accessible to the fax server 109 or the enterprise server 120.

For illustrative purposes, the foregoing has been described with respect to a configuration in which the fax server 109, print server 110, and enterprise server 120 are separate entities. However, it is not required that these servers be implemented on separate machines, or for that matter, as separate server entities.

Figure 2:
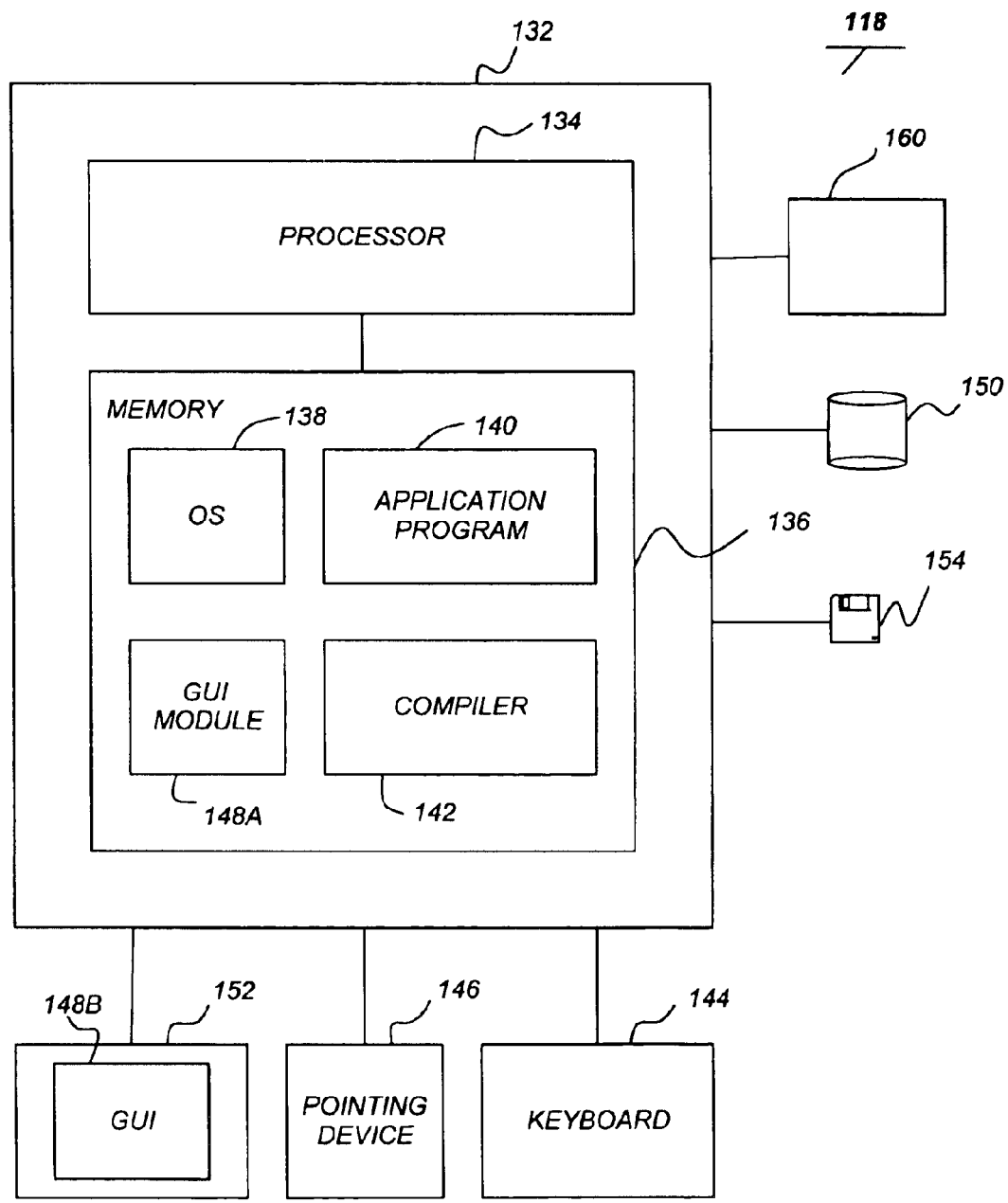
FIG. 2 is a diagram illustrating one embodiment of a computer that can be used to practice the present invention.

FIG. 2 illustrates an exemplary computer system 118 that could be used to implement the present invention. The computer 132 comprises a processor 134 and a memory 136, such as random access memory (RAM). The computer 132 is operatively coupled to a display 152, which presents images such as windows to the user on a graphical user interface 148B. The computer 132 may be coupled to other devices, such as a keyboard 144, a mouse device 146, a printer, etc. Of course, those skilled in the art will recognize that any combination of the above components, or any number of different components, peripherals, and other devices, may be used with the computer 132.

Generally, the computer 132 operates under control of an operating system 138 stored in the memory 136, and interfaces with the user to accept inputs and commands and to present results through a graphical user interface (GUI) module 148A. Although the GUI module 148A is depicted as a separate module, the instructions performing the GUI functions can be resident or distributed in the operating system 138, the computer program 140, or implemented with special purpose memory and processors. The computer 132 also implements a compiler 142 which allows an application program 140 written in a programming language such as COBOL, C++, FORTRAN, or other language to be translated into processor 134 readable code. After completion, the application 140 accesses and manipulates data stored in the memory 136 of the computer 132 using the relationships and logic that was generated using the compiler 142. The computer 132 also optionally comprises an external communication device such as a modem, satellite link, Ethernet card, or other device for communicating with other computers.

In one embodiment, instructions implementing the operating system 138, the computer program 140, and the compiler 142 are tangibly embodied in a computer-readable medium, e.g., data storage device 150, which could include one or more fixed or removable data storage devices, such as a zip drive, floppy disc drive 154, hard drive, CD-ROM drive, tape drive, etc. Further, the operating system 138 and the computer program 140 are comprised of instructions which, when read and executed by the computer 132, causes the computer 132 to perform the steps necessary to implement and/or use the present invention. Computer program 140 and/or operating instructions may also be tangibly embodied in memory 136 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Process

Figure 3A:
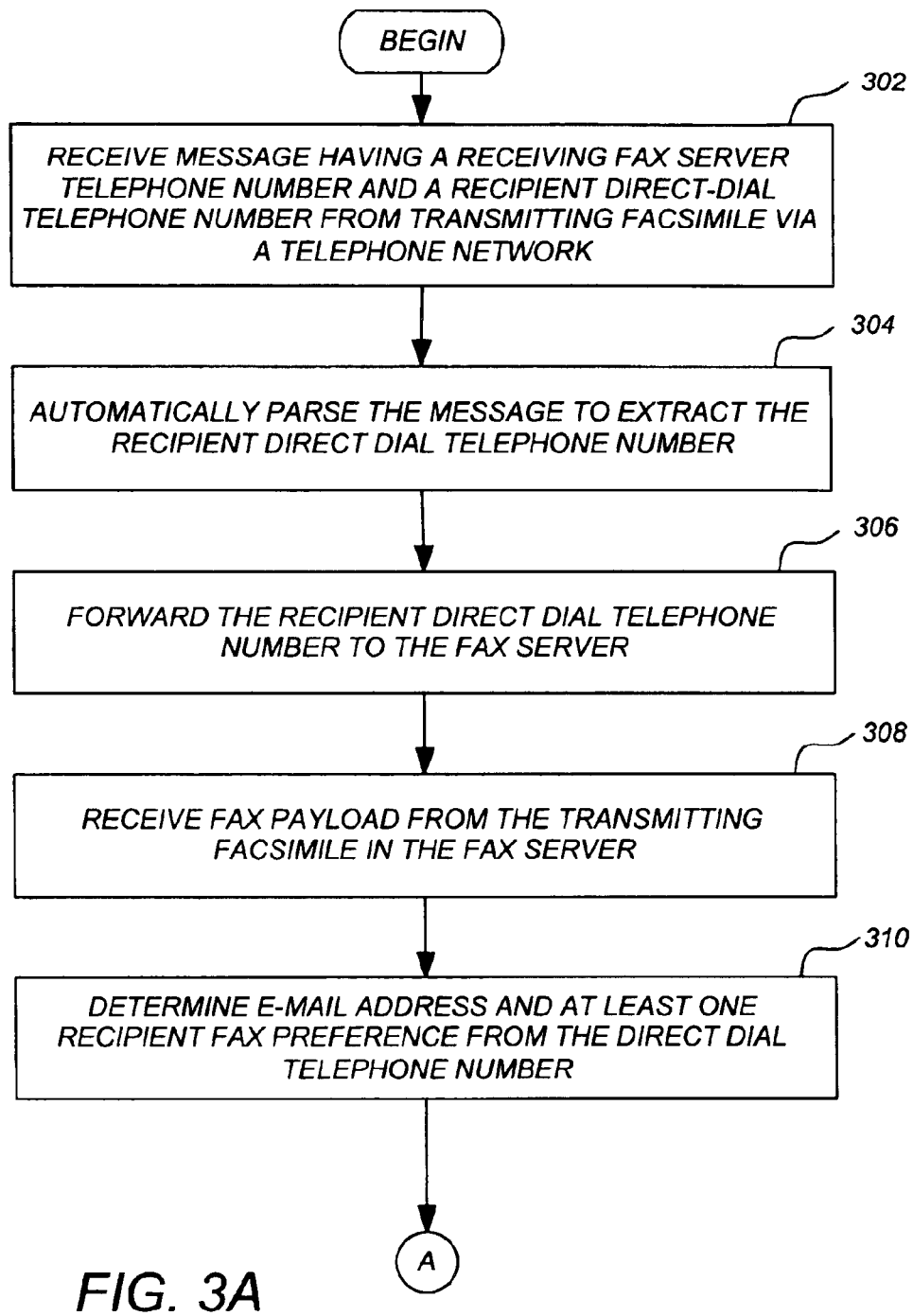
FIGS. 3A and 3B are flow charts presenting an illustrative example of process steps used to practice the present invention.
Figure 3B:
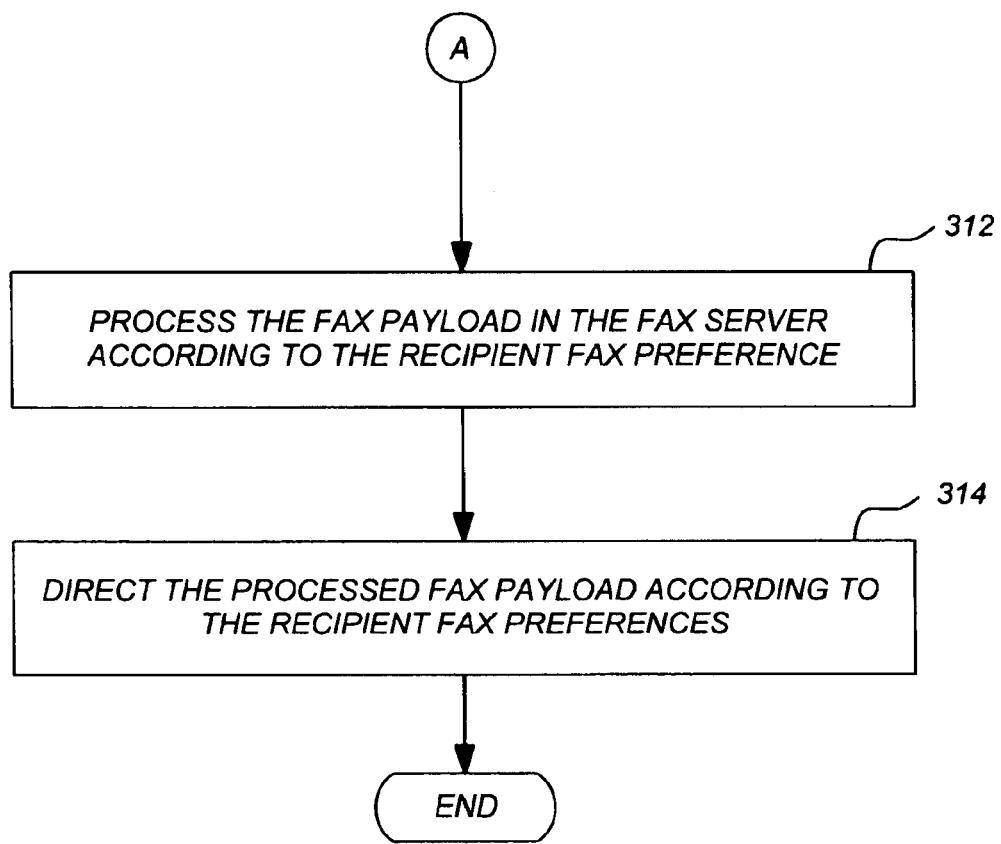

FIGS. 3A and 3B are figures showing the exemplary operations used to practice one embodiment of the present invention. First, a message is received from the transmitting facsimile 102 via a telephone network 103, as shown in block 302. The fax message comprises a telephone number accessing the receiving fax server 109 and an appended recipient direct dial telephone number. The message is then automatically parsed 304 to extract the recipient's direct dial telephone number. In one embodiment of the present invention, this is accomplished by using a fax card 113 DID facility. The direct dial telephone number is then forwarded 306 to the fax server 109, which uses the direct dial telephone number to determine 310 the e-mail address and at least one recipient fax preference while the fax payload is received from the transmitting facsimile 102 in the fax server 109.

The fax payload is then processed according to the recipient fax preferences read from the recipient information 126. Then, the processed fax payload is directed according to the recipient fax preferences. These preferences include, for example, those preferences described above with respect to FIG. 1.

Ordinarily, this involves converting the fax payload into a portable document format, and attaching it to an e-mail that is sent to the recipient. In one embodiment of the present invention, recipient fax preference include an indication of whether the fax should be delivered as an e-mail attachment to the recipient, redirected to another facsimile machine at a remote location or a location in the same facility, or simply placed into a directory folder accessible by the recipient for later viewing. If the facsimile is not e-mailed to the recipient, a message may be generated to inform the user that a facsimile message has arrived.

Facsimile messages that are received without an extension number or that cannot addressed using the techniques above are held in the fax server 109, the print server 110, or the enterprise server 120 for a system administrator to direct or delete. This helps deal with junk facsimile transmissions.

Figure 4:
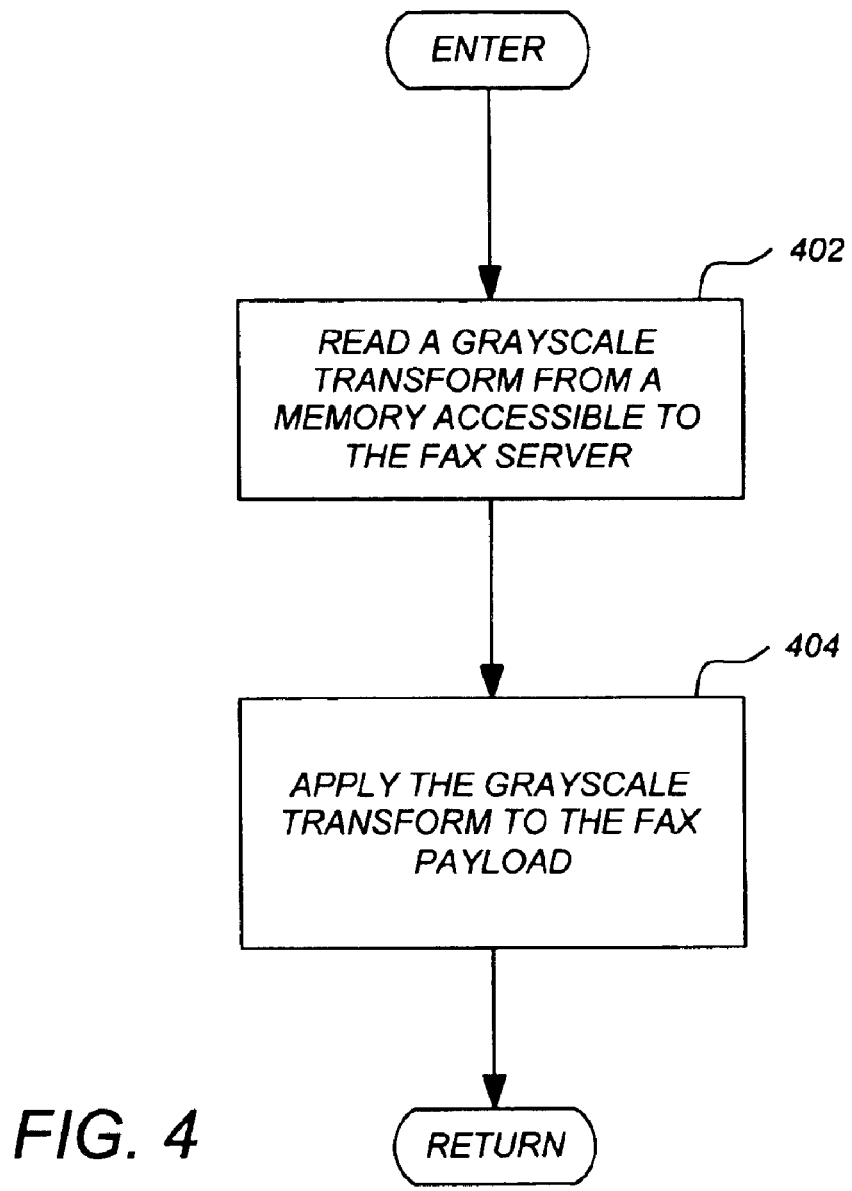
FIG. 4 is a flow chart presenting exemplary process steps used in processing the fax payload in the fax server according to the recipient fax preferences.

FIG. 4 is a flow chart presenting exemplary method steps used in processing the fax payload in the fax server according to the recipient fax preferences. In this illustrated example, the fax preference refers to which grayscale transform applied to the received fax payload so that the grayscales will be properly rendered on the presentation device 111. First, a grayscale transform is read from a memory accessible to the fax server 109, as shown in step 402. Next, the grayscale transform is applied to the fax payload to alter the grayscale commands of the fax payload to account for the grayscale rendering characteristics of the presentation device 111. The grayscale transforms can also be applied in the print server 10, and stored in a memory accessible thereto as well.

Figure 5:
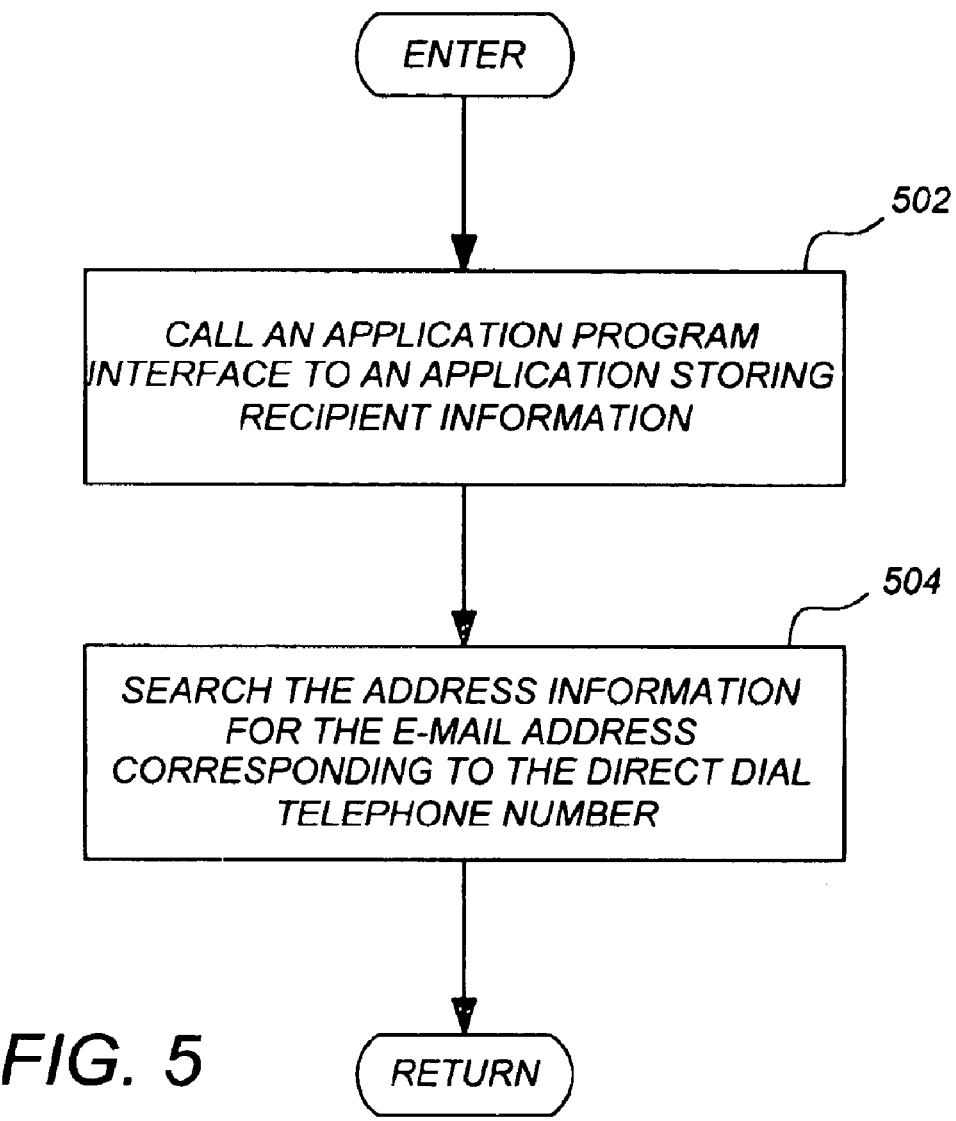
FIG. 5 is a flow chart presenting exemplary process steps used in determining an e-mail address and at least one recipient fax preference from the direct dial telephone number.

FIG. 5 is a flow chart presenting exemplary process steps used in determining an e-mail address and at least one recipient fax preference from the direct dial telephone number. An application program interface 122 to an application storing recipient information 126 is called, as shown in block 502. Then, the address information is searched, using the direct dial telephone number of the recipient as a parsing parameter, to find the corresponding e-mail address of the recipient.

Conclusion

This concludes the description of the preferred embodiments of the present invention. In summary, the present invention describes a method, apparatus, and article of manufacture for electronically distributing facsimile messages directly to users according to recipient preferences.

The method comprises the steps of receiving a message from a transmitting facsimile via a telephone network, automatically parsing the message to extract a recipient direct dial telephone number from the message, receiving a fax payload from the transmitting facsimile in a fax server, determining an e-mail address and at least one recipient fax preference from the direct dial telephone number, processing the fax payload in the fax server according to the recipient fax preference, and directing the processed fax message according to the recipient fax preference. In one embodiment of the present invention, method further comprises the steps of reading a grayscale transform from a memory accessible to the fax server, and applying the grayscale transform to the fax payload. This allows the facsimile to be presented to the user with improved grayscale rendering accuracy. In another embodiment of the present invention, recipient's direct dial telephone number is extracted using the direct inward dial facility of a facsimile card, thus providing a simple straightforward means for determining the identity of the intended recipient. In another embodiment of the present invention, the e-mail address of the intended recipient is obtained from an address lookup facility of a messaging and collaboration application. The apparatus comprises means for performing the foregoing steps, and the article of manufacture comprises a program storage device tangibly embodying instructions for performing these steps.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of managing the distribution of facsimile messages to a recipient, comprising:

receiving a message from a transmitting facsimile via a telephone network, the message comprising receiving fax server telephone number appended with a recipient direct dial telephone number;

automatically parsing the message to extract the recipient direct dial telephone number from the message;

receiving a fax payload from the transmitting facsimile in the fax server;

determining an e-mail address and at least one recipient fax preference from the direct dial telephone number;

processing the fax payload according to the recipient fax preference; and directing the processed fax message according to the recipient fax preference.

2. The method of claim 1, wherein the step of processing the fax payload in the fax server according to the recipient fax preference comprises the steps of:

reading a grayscale transform from a memory accessible to the fax server; and applying the grayscale transform to the fax payload.

3. The method of claim 1, wherein the step of automatically parsing the message to extract the recipient direct dial tlephone number from the message is performed by a fax card.

4. The method of claim 1, wherein the step of automatically parsing the message to extract the recipient direct dial telephone number from the message is performed by a processor responding to instructions to extract the recipient direct dial telephone number from the message.

5. The method of claim 1, wherein the step of determining an e-mail address and at least on recipient fax preference from the direct dial telephone number comprises the steps of:

calling an application program interface in the fax server to an application managing recipient information comprising the e-mail address and the direct dial telephone number of the recipient; and searching the recipient information for the e-mail address corresponding to the direct dial telephone number.

6. The method of claim 1, the message further comprises a transmitting facsimile identification and wherein the fax preference describes an identification of a junk fax source, and the step of processing the converted fax message according to the recipient fax preferences comprises the step of deleting the received fax payload if the transmitting facsimile identification corresponds to the identification of the junk fax source.

7. The method of claim 1, wherein the fax preference describes a preferred portable document format, and the step of processing the fax payload in the fax server comprises the step of converting the fax payload to the preferred portable document format.

8. The method of claim 1, wherein the fax preference describes forwarding fax information, and the method further comprises the step of forwarding the fax message according to the forwarding fax information.

9. The method of claim 1, further comprising the step of transmitting a confirming message to the transmitting facsimile.

10. The method of claim 9, wherein the confirming message comprises a portion of the fax payload.

11. An apparatus for managing the distribution of facsimile messages to a recipient, comprising:

means for receiving a message from a transmitting facsimile via a telephone network, the message comprising receiving fax server telephone number appended with a recipient direct dial telephone number;

means for automatically parsing the message to extract the recipient direct dial telephone number from the message;

means for receiving a fax payload from the transmitting facsimile in the fax server;

means for determining an e-mail address and at least one recipient fax preference from the direct dial telephone number;

means for processing the fax payload according to the recipient fax preference; and means for directing the processed fax message according to the recipient fax preference.

12. The apparatus of claim 11, wherein the means for processing the fax payload in the fax server according to the recipient fax preference comprises:

means for reading a grayscale transform from a memory accessible to the fax server; and means for applying the grayscale transform to the fax payload.

13. The apparatus of claim 11, wherein the means for automatically parsing the message to extract the recipient direct dial telephone number from the message is a fax card.

14. The apparatus of claim 11, wherein the means for automatically parsing the message to extract the recipient direct dial telephone number comprises a processor responding to instructions to extract the recipient direct dial telephone number from the message.

15. The apparatus of claim 11, wherein the means for determining an e-mail address and at least one recipient fax preference from the direct dial telephone number comprises:

means for calling an application program interface in the fax server to an application managing recipient information comprising the e-mail address and the direct dial telephone number of the recipient; and means for searching the recipient information for the e-mail address corresponding to the direct dial telephone number.

16. The apparatus of claim 11, the message further comprises a transmitting facsimile identification and wherein the fax preference describes an identification of a junk fax source, and the means for processing the converted fax message according to the recipient fax preferences comprises means for deleting the received fax payload if the transmitting facsimile identification corresponds to the identification of the junk fax source.

17. The apparatus of claim 11, wherein the fax preference describes a preferred portable document format, and the means for processing the fax payload in the fax server comprises means for converting the fax payload to the preferred portable document format.

18. The apparatus of claim 11, wherein the fax preference describes forwarding fax information, and the apparatus further comprises means for forwarding the fax message according to the forwarding fax information.

19. The apparatus of claim 11, further comprising means for transmitting a confirming message to the transmitting facsimile.

20. The apparatus of claim 19, wherein the confirming message comprises a portion of the fax payload.

21. A program storage device, readable by a computer, tangibly embodying at least one program of instructions executable by the computer to perform method steps of managing the distribution of facsimile messages to a recipient, the method steps comprising the steps of:

receiving a message from a transmitting facsimile via a telephone network, the message comprising receiving fax server telephone number appended with a recipient direct dial telephone number;

automatically parsing the message to extract the recipient direct dial telephone number from the message;

receiving a fax payload from the transmitting facsimile in the fax server;

determining an e-mail address and at least one recipient fax preference from the direct dial telephone number;

processing the fax payload according to the recipient fax preference; and directing the processed fax message according to the recipient fax preference.

22. The program storage device of claim 21, wherein the method step of processing the fax payload in the fax server according to the recipient fax preference comprises the method steps of:

reading grayscale transform from a memory accessible to the fax server; and applying the grayscale transform to the fax payload.

23. The program storage device of claim 21, wherein the method step of automatically parsing the message to extract the recipient direct dial telephone number from the message is performed by a fax card.

24. The program storage device of claim 21, wherein the method step of determining an e-mail address and at least on recipient fax preference from the direct dial telephone number comprises the method steps of:

calling an application program interface in the fax server to an application managing recipient information compising the e-mail address and the direct dial telephone number of the recipient; and searching the recipient information for the e-mail address corresponding to the direct dial telephone number.

25. The program storage device of claim 21, the message further comprises a transmitting facsimile identification and wherein the fax preference describes an identification of a junk fax source, and the method step of processing the converted fax message according to the recipient fax preferences comprises the method step of deleting the received fax payload if the transmitting facsimile identification corresponds to the identification of the junk fax source.

26. The program storage device of claim 21, wherein the fax preference describes a preferred portable document format, and the method step of processing the fax payload in the fax server comprises the method step of coverting the fax payload to the preferred portable document format.

27. The program storage device of claim 21, wherein the fax preference describes forwarding fax information, and the method steps further comprises the method step of forwarding the fax message according to the forwarding fax information.

28. The program storage device of claim 21, wherein the method steps further comprising the method step of transmitting a confirming message to the transmitting facsimile.

29. The program storage device of claim 28, wherein the confirming message comprises a portion of the fax payload.

30. The method of claim 1, further comprising the step of:

detecting whether the fax payload is essentially identical to an earlier received fax payload.

31. The method of claim 30, further comprising the step of:

terminating the reception of the fax payload if the fax payload is essentially identical to an earlier received fax payload.

32. The method of claim 31, further comprising the step of:

flagging the fax payload for deletion if the fax payload is essentially identical to an earlier received fax payload.

* * * * *

UNITED STATES PATENT AND TRADEMARK OFFICE
CERTIFICATE OF CORRECTION

PATENT NO. : 6,897,971 B1
DATED : May 24, 2005
INVENTOR(S) : Keith A. Marshall et al.

It is certified that error appears in the above-identified patent and that said Letters Patent is hereby corrected as shown below:

<u>Column 8,</u>
Line 3, "tlephone" should read -- telephone --.
Line 11, "on" should read -- one --.

<u>Column 10,</u>
Line 13, "on" should read -- one --.

Signed and Sealed this

Second Day of May, 2006

JON W. DUDAS
*Director of the United States Patent and Trademark Office*